US012343886B2

(12) United States Patent
Huang

(10) Patent No.: US 12,343,886 B2
(45) Date of Patent: Jul. 1, 2025

(54) BOXCUTTER

(71) Applicant: INDUSTRO INTERNATIONAL CO., LTD., Taichung (TW)

(72) Inventor: Kuo-Chan Huang, Taichung (TW)

( * ) Notice: Subject to any disclaimer, the term of this patent is extended or adjusted under 35 U.S.C. 154(b) by 299 days.

(21) Appl. No.: 18/202,947

(22) Filed: May 28, 2023

(65) Prior Publication Data

US 2024/0391118 A1 Nov. 28, 2024

(51) Int. Cl.
*B26B 1/08* (2006.01)
*B26B 1/10* (2006.01)
*B26B 5/00* (2006.01)

(52) U.S. Cl.
CPC .................. *B26B 1/08* (2013.01); *B26B 1/10* (2013.01); *B26B 5/001* (2013.01); *B26B 5/003* (2013.01)

(58) Field of Classification Search
CPC .......... B26B 5/001; B26B 5/003; B26B 29/02
See application file for complete search history.

(56) References Cited

U.S. PATENT DOCUMENTS 2,874,462 A * 2/1959 Benedict, Jr. ........... B26B 5/001 30/162
10,076,846 B2 * 9/2018 Ranieri ................... B26B 5/001
10,179,416 B2 * 1/2019 Wang ...................... B26B 5/001
11,104,014 B2 * 8/2021 Gomez ................... B26B 5/001
11,642,801 B1 * 5/2023 Dovel ....................... B26B 5/00 30/162
11,679,516 B2 * 6/2023 Gallegos ................... B26B 1/08 30/162
11,772,288 B2 * 10/2023 Ranieri ................... B26B 5/002 30/162
2007/0277382 A1 * 12/2007 Okada ..................... B26B 5/003 30/162
2008/0250650 A1 * 10/2008 Seber ...................... B26B 5/001 30/162
2014/0317936 A1 * 10/2014 Wu ......................... B26B 5/003 30/162
2014/0366385 A1 * 12/2014 Herlitz .................... B26B 5/001 30/162
2015/0246451 A1 * 9/2015 Robinson ................ B26B 5/001 30/162
2015/0258696 A1 * 9/2015 Wang ...................... B26B 5/001 30/162

(Continued)

FOREIGN PATENT DOCUMENTS

TW 297319 2/1997

*Primary Examiner* — Sean M Michalski
(74) *Attorney, Agent, or Firm* — BruceStone LLP; Joseph A. Bruce

(57) ABSTRACT

A boxcutter includes a handle, a blade and a holder. The handle includes a bump on an internal face. The blade is insertable in the handle. The holder is moveable in the handle between a front position to extend a front section of the blade from the handle and a rear position to insert the blade entirely in the handle. The holder includes a carrier and an elastic leaf. The carrier includes a flat space for receiving a rear section of the blade. The elastic leaf includes a rear section connected to the carrier and a front section formed with a lever and a latch. The lever extends over the carrier and the latch extends in the cutout. When the holder is in the front position, the lever abuts against the bump to deform the elastic leaf to move the latch from the cutout.

16 Claims, 14 Drawing Sheets

(56) References Cited

U.S. PATENT DOCUMENTS

| | | | | |
|---|---|---|---|---|
| 2016/0023364 | A1* | 1/2016 | Raymond | B26B 29/00 30/162 |
| 2016/0046026 | A1* | 2/2016 | Ranieri | B26B 5/001 30/162 |
| 2016/0158945 | A1* | 6/2016 | Herlitz | B26B 1/08 30/162 |
| 2016/0184999 | A1* | 6/2016 | Gilbert | B26B 5/00 30/162 |
| 2022/0395991 | A1* | 12/2022 | Rowlay | B26B 5/003 |
| 2024/0190028 | A1* | 6/2024 | Trivedi | B26B 5/005 |

* cited by examiner

BOXCUTTER

BACKGROUND OF INVENTION

1. Field of Invention

The present invention relates to a boxcutter and, more particularly, to a boxcutter that allows easy replacement of a used blade with a new blade.

2. Related Prior Art

Taiwanese Patent No. 297319 discloses a boxcutter including a blade 13, a blade holder and a handle. The blade 13 is inserted in and extensible from the handle, which includes two shells 11 and 12. The blade holder includes a knob 20, a catch 21, a compression spring 22 and a threaded bolt 23. The knob 20 is located out of the handle. The catch 21 is movable in the handle. The threaded bolt 23 includes a threaded section inserted in a screw hole 26 made in the catch 21 and an enlarged head located out of the handle and abutted against the knob 20. The compression spring 22 receives the threaded section of the threaded bolt 23 and is compressed between the handle and the catch 21. Thus, the compression spring 22 tends to press the catch 21 on the blade 13 so that two ribs 24 of the catch 21 are inserted in two cutouts 15 made in the blade 13. Thus, a rear section of the blade 13 is kept in the handle while a front section of the blade 13 is extended from the handle for use. Now, the knob 20 is located at an angle on the handle so that the handle is located between feet 27 extending from the knob 20.

To replace the blade 13 with a new one, the knob 20 is lifted from the handle to move the ribs 24 from the cutouts 15, thereby allowing the blade 13 to be detached from the handle. To facilitate insertion of a rear section of a new blade into the handle, the knob is rotated to another angle on the sell so that the feet 27 stand on the handle to keep the ribs 24 out of the cutouts 15.

It should be noted that the front section of the blade 13 is extended from the handle while the rear section of the blade 13 is kept in the handle. The front section of the blade 13 includes a sharp tip that imposes a potential danger for humans.

The present invention is therefore intended to obviate or at least alleviate the problems encountered in the prior art.

SUMMARY OF INVENTION

It is the primary objective of the present invention to provide a safe and convenient boxcutter.

To achieve the foregoing objective, the boxcutter includes a handle, a blade and a holder. The handle includes a bump on an internal face. The blade is insertable in the handle. The holder is moveable in the handle between a front position to extend a front section of the blade from the handle and a rear position to insert the blade entirely in the handle. The holder includes a carrier and an elastic leaf. The carrier includes a flat space for receiving a rear section of the blade. The elastic leaf includes a rear section connected to the carrier and a front section formed with a lever and a latch. The lever extends over the carrier and the latch extends in the cutout. When the holder is in the front position, the lever abuts against the bump to deform the elastic leaf to move the latch from the cutout.

Other objectives, advantages and features of the present invention will be apparent from the following description referring to the attached drawing.

BRIEF DESCRIPTION OF DRAWINGS

The present invention will be described via detailed illustration of the preferred embodiment referring to the drawings wherein.

DETAILED DESCRIPTION OF PREFERRED EMBODIMENT

Figure 1:
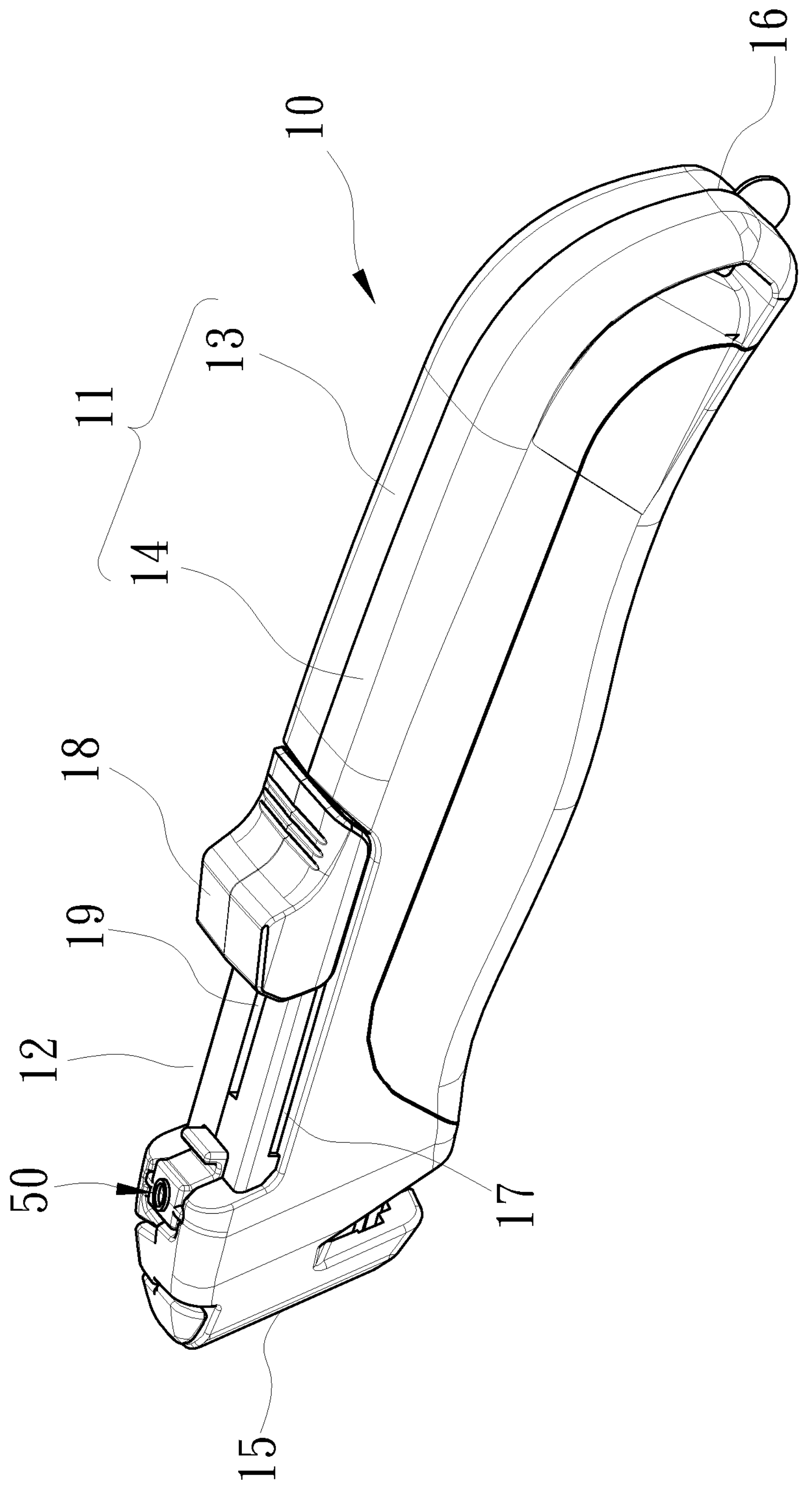
FIG. 1 is a perspective view of a boxcutter according to the preferred embodiment of the present invention.
Figure 2:
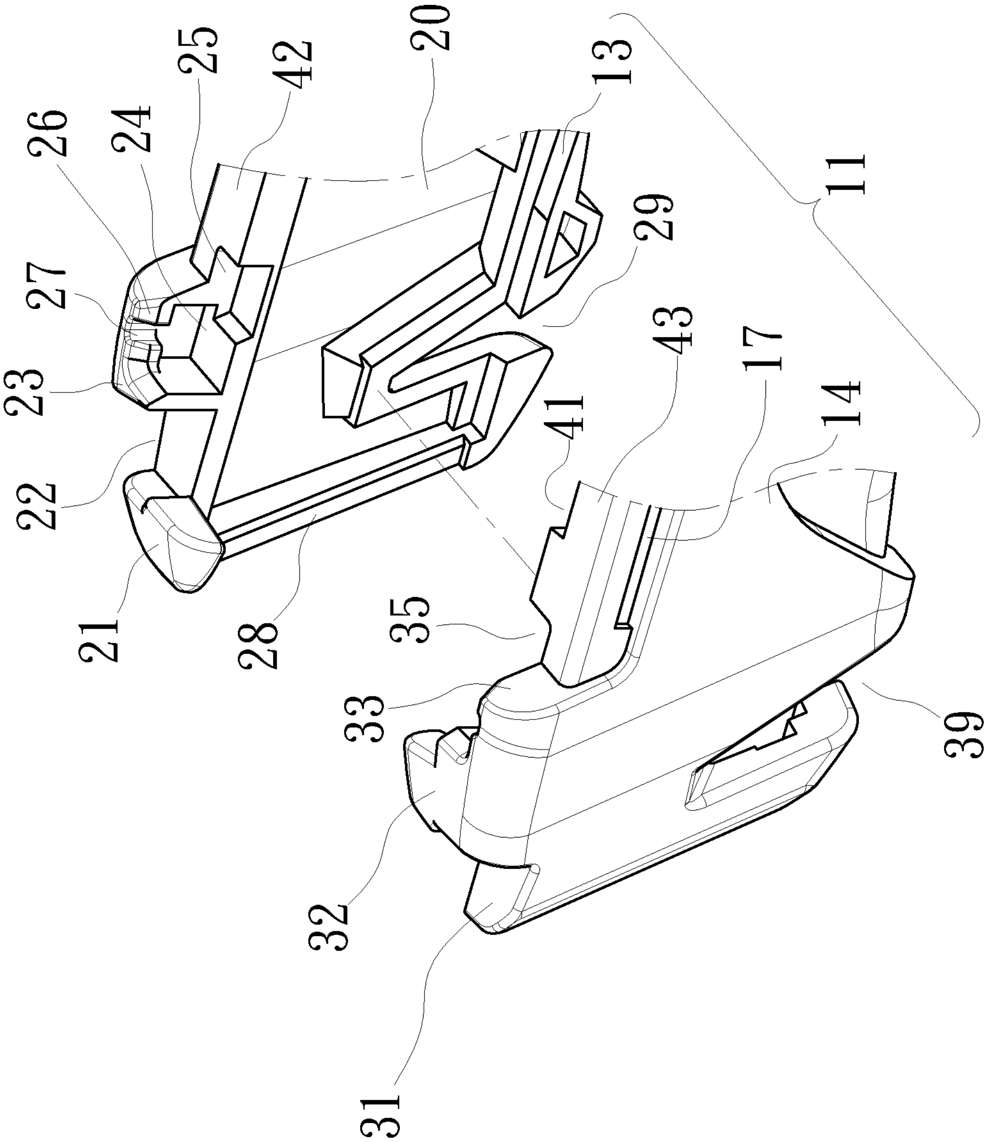
FIG. 2 is an exploded view of a handle of the boxcutter of FIG. 1.
Figure 3:
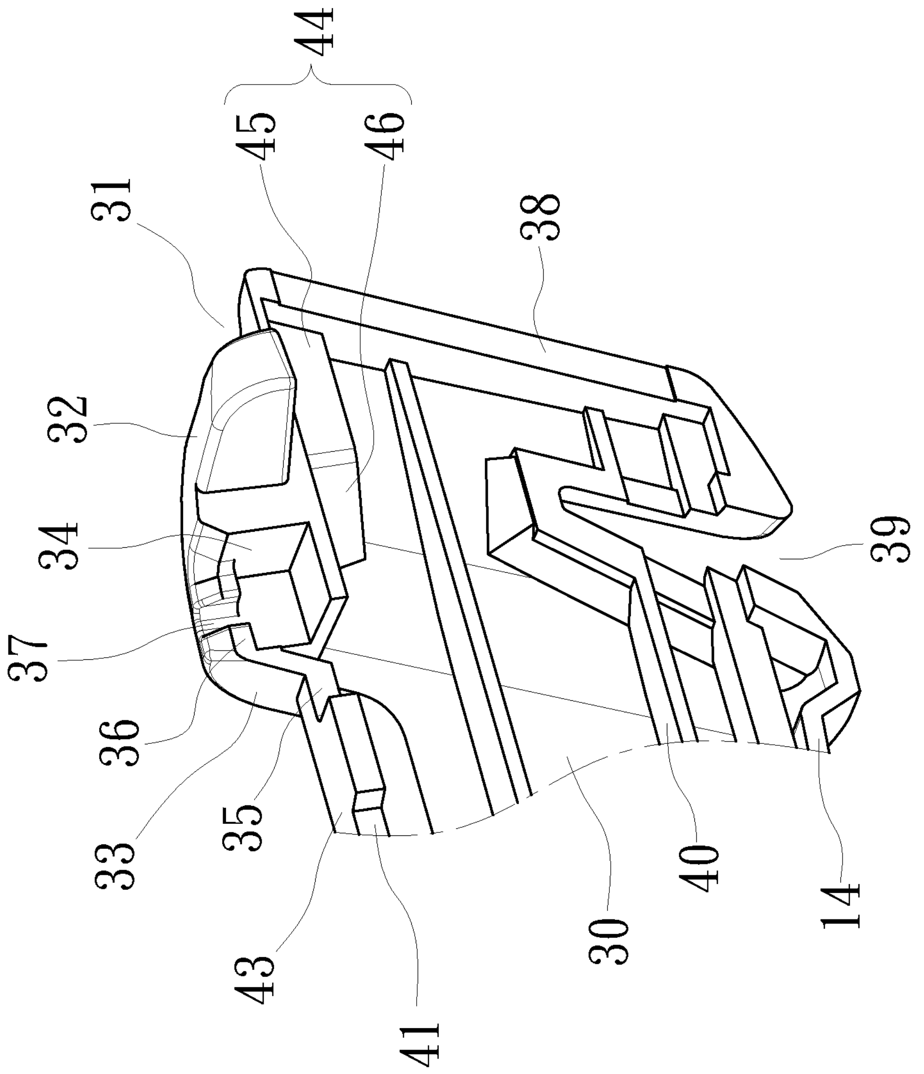
FIG. 3 is a partial view of a shell of the handle shown in FIG. 2.
Figure 4:
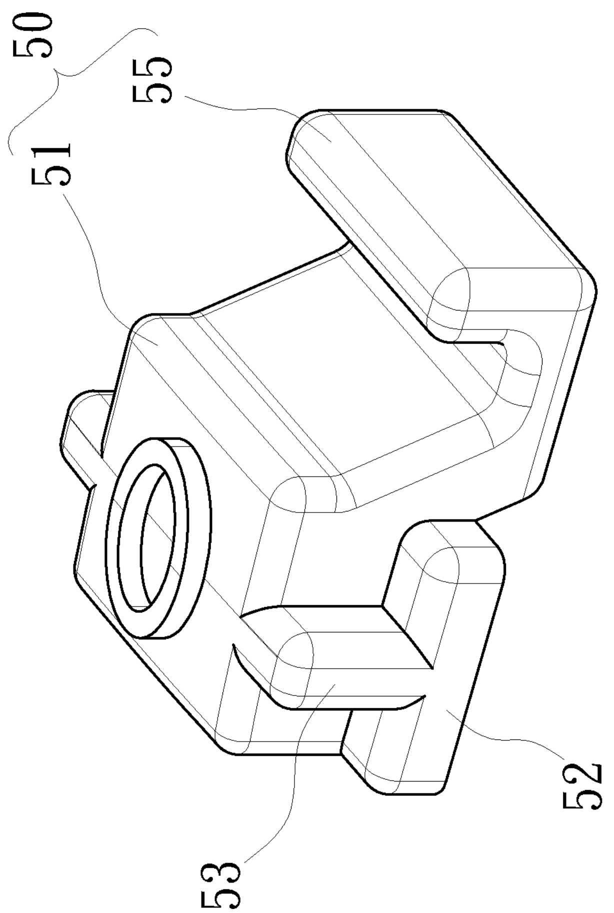
FIG. 4 is a perspective view of a button of the boxcutter depicted in FIG. 1.
Figure 5:
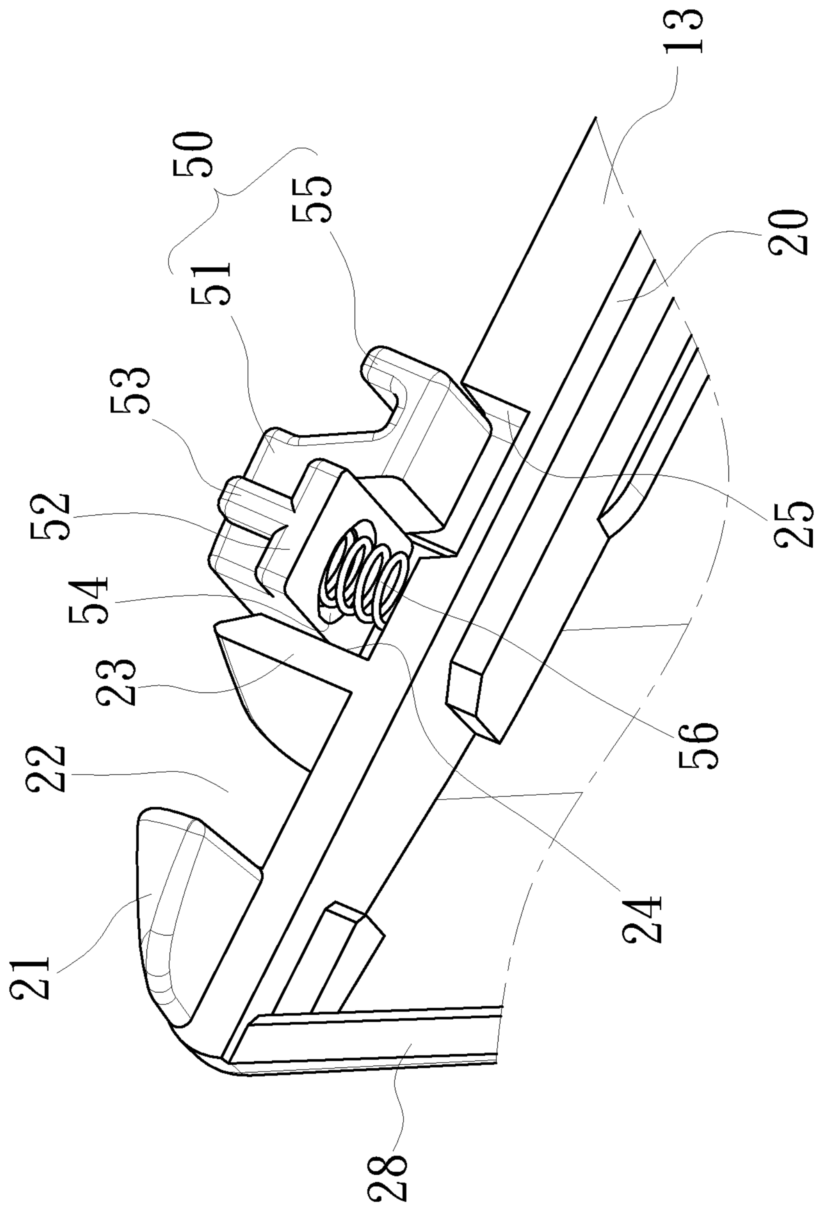
FIG. 5 is a perspective view of the button shown in FIG. 4 and another shell of the handle shown in FIG. 2.
Figure 6:
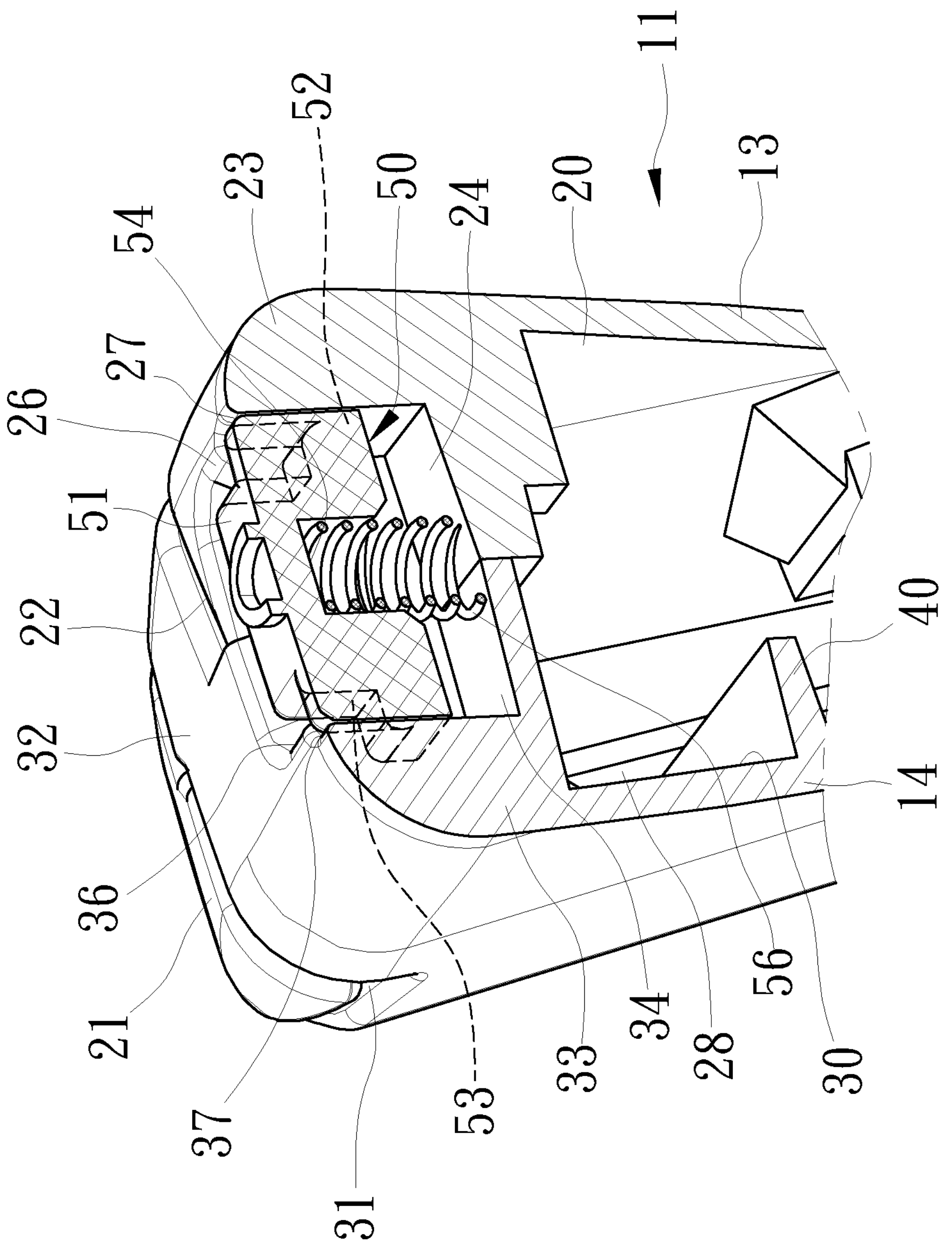
FIG. 6 is a cut-away view of the button and shell shown in FIG. 5.
Figure 8:
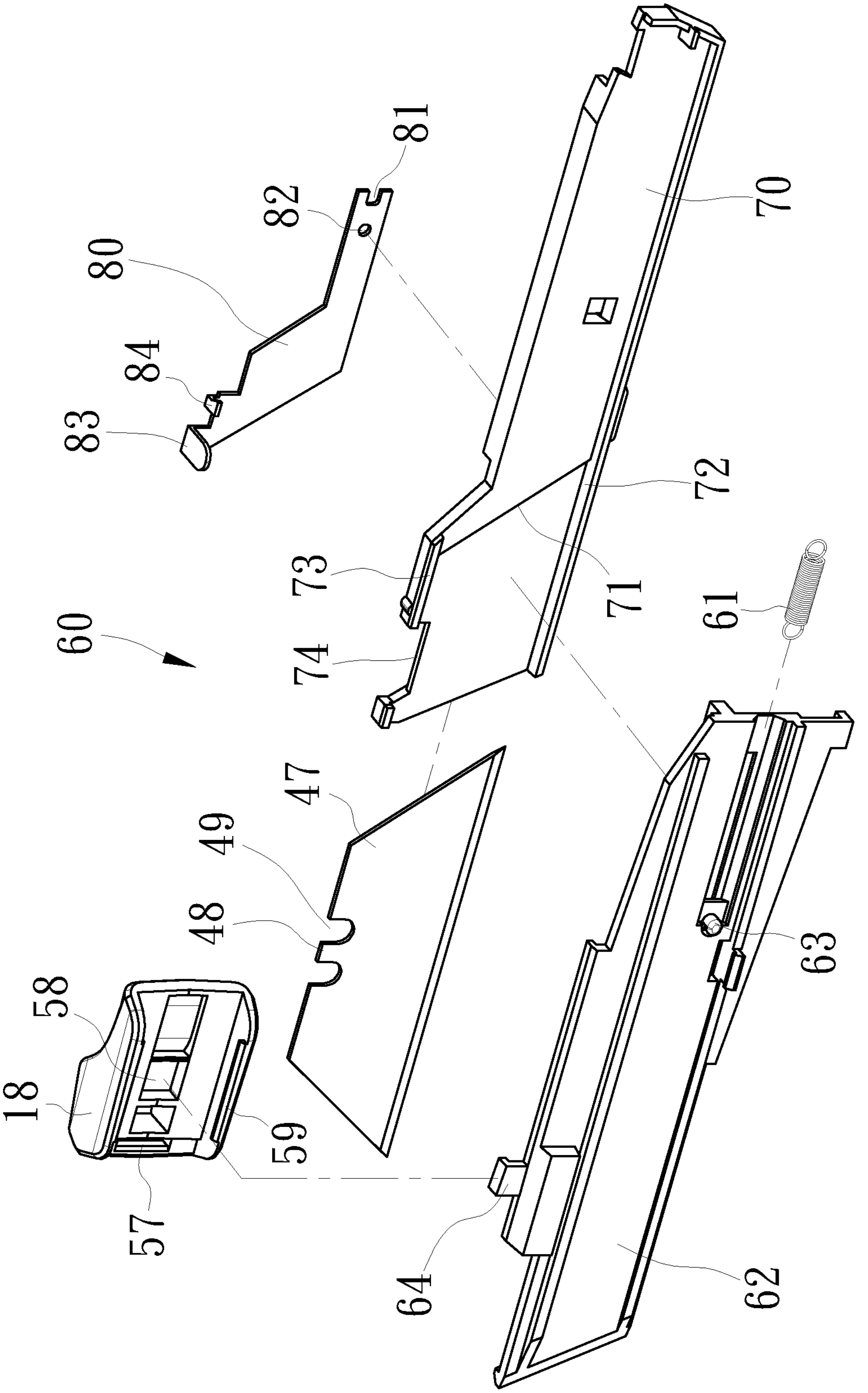
FIG. 8 is an exploded view of the blade and holder shown in FIG. 7.

Referring to FIGS. 1 and 8, a boxcutter 10 includes a handle 11, a blade 47 and a holder 60 according to the preferred embodiment of the present invention. The blade 47 includes a front section extended from the holder 60 and a rear section inserted in the holder 60. The holder 60 is movable between a front position and a rear position. In the front position, the holder 60 extends the front section of the blade 47 from the handle 11. In the rear position, the holder 60 inserts the front section of the blade 47 in the handle 11.

The handle 11 includes an open (front) end 15 and a closed (rear) end 16. In comparison with the closed end 16, the open end 15 is located near an object being cut by the boxcutter 10. The handle 11 includes a space 12 in an upper portion located closer to the open end 15 than to the closed end 16. A button 50 and a switch are located in the space 12. The switch 18 is translatable in and along the space 12.

Preferably, the handle 11 includes two shells 13 and 14 connected to each other. An internal side of the shell 13 is directed at an internal side of the shell 14. Each of the shells 13 and 14 includes a front end corresponding the open end 15 and a rear end corresponding to the closed end 16.

Referring to FIGS. 2 through 6, the shell 13 includes a connector 21 in the form of a hook including a right portion formed on an upper face of the shell 13 and a left portion inserted in a recess 31 made in an upper face of the shell 14 when the handle 11 is assembled. The shell 14 includes a connector 32 in the form of a hook including a left portion formed on the upper face of the shell 14 and a right portion inserted in recess 22 made in the upper face of the shell 13. The left portion of the connector 21 is engaged with the right portion of the connector 32 to keep the shells 13 and 14 in contact with each other. Alternatively, the connector 32 can be formed on the shell 13 and the recess 22 made in the shell 14, and the recess 31 can be made in the shell 13 and the connector 21 formed on the shell 14.

On the upper face, the shell 13 further includes a protrusion 23 and a platform 42. The protrusion 23 is located between the recess 22 and the platform 42. The protrusion 23 includes a cavity 24 in communication with a cutout 27. The cutout 27 is made in a shoulder 26 formed on an internal side of the protrusion 23. A bore 25 is made between the cavity 24 and the platform 42.

Similarly, on the upper face, the shell 14 further includes a protrusion 33. Preferably, the protrusion 33 is made in one piece with the connector 32. The combination of the protrusion 33 with the connector 32 is located between the recess 31 and a platform 43 formed on the upper face of the shell 14. The protrusion 33 includes a cavity 34 in communication with a cutout 37. The cutout 37 is made in a shoulder 36 formed on an internal side of the protrusion 33. A bore 35 is made between the cavity 34 and the platform 43. An edge of the shell 14 is made with an elongated recess 41, adjacent to the platform 43. Several ribs 40 are formed on the internal side of the shell 14 to reinforce the shell 14. A bump 44 is also formed on the internal side of the shell 14. The bump 44 includes a vertical facet 45 and a slant facet 46. The slant facet 46 descends to the internal side of the shell 14 from a rear end of the vertical facet 45.

The button 50 includes a major portion 51, two fins 52, two upright portions 53, a hole 54 and a hook 55. The fins 52 extend from two lateral sides of the major portion 51. The upright portions 53 extend on the lateral sides of the major portion 51. Each of the fins 52 and a corresponding one of the upright portions 53 form an inverted T-shaped portion. However, in another embodiment, each of the fins 52 is not connected to the corresponding one of the upright portions 53. The hole 54 is made in a lower face of the major portion 51. The hook 55 extends from a rear face of the major portion 51.

The protrusions 23 and 33 are in contact with each other so that the cavities 24 and 34 become one for receiving the major portion 51. The bores 25 and 35 become one for receiving the hook 55. A compression spring 56 includes an end inserted in the hole 54 and another end in contact with the floors of the cavities 24 and 34. The compression spring 56 is compressed between the button 50 and the handle 11, thereby tending to lift the button 50 from the handle 11. The hook 55 includes a free end normally located above the platforms 42 and 43. The shoulders 26 and 36 form an internal flange for abutment against the fins 52. Thus, the button 50 is kept on the handle 11. The cutouts 27 and 37 receive the upright portions 53 to allow smooth movement up and down of the major portion 51 relative to the protrusions 23 and 33, i.e., of the hook 55 relative to the handle 11.

The platforms 42 and 43 together form a floor of the space 12 of the handle 11 (FIG. 1). The elongated recess 41 is located next to an edge of the platform 42 so that it becomes a slot 19 in the handle 11. A space in the handle 11 is in communication with the space 12 through the slot 19. A groove 17 is made in the shell 13 in vicinity of the platform 42. Another groove 17 is made in the shell 14 in vicinity of the platform 43. Thus, the space 12 is located between the grooves 17.

Figure 12:
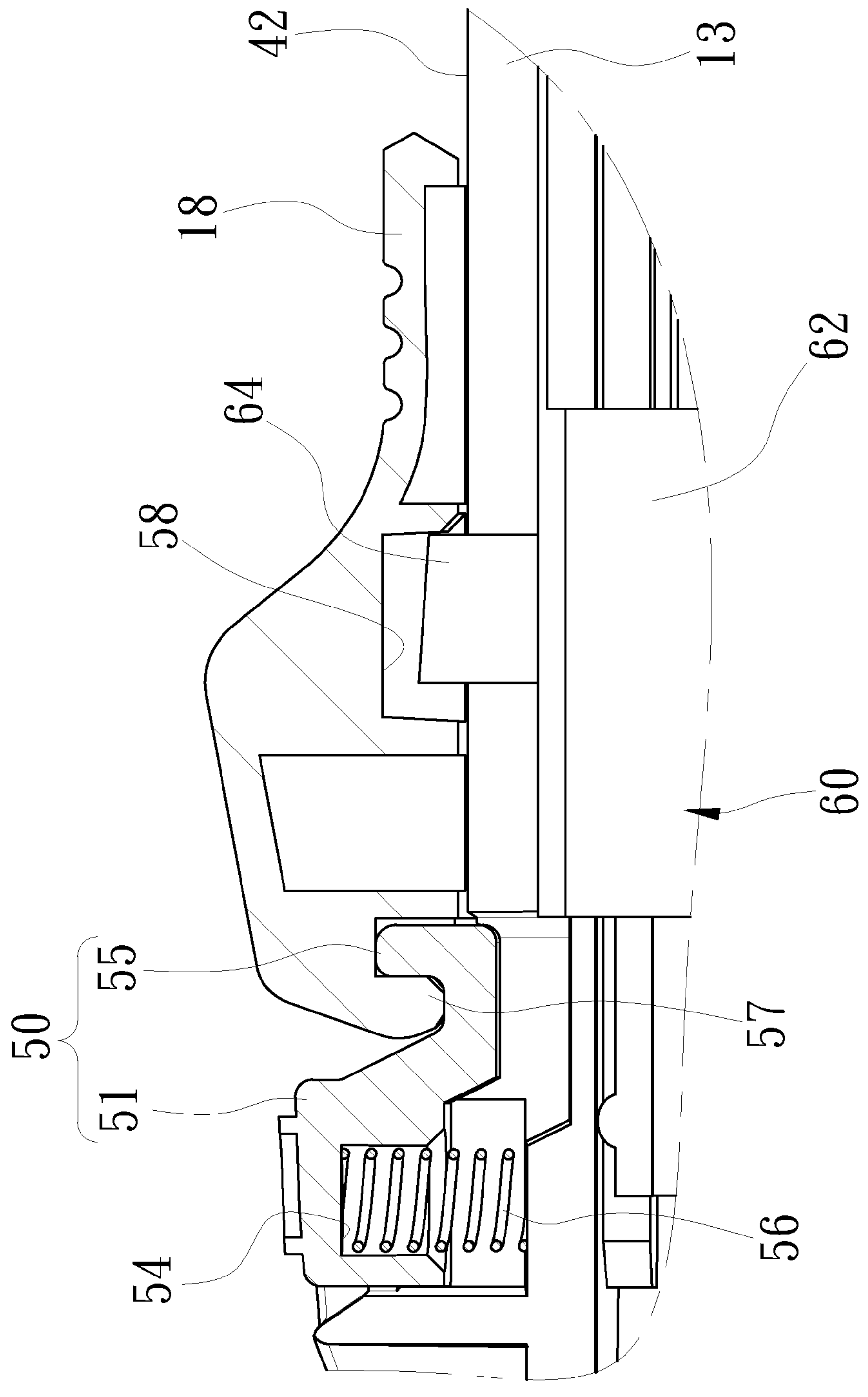
FIG. 12 is an enlarged partial vie of the blade and holder depicted in FIG. 11.

Referring to FIG. 8, the switch 18 includes a hook 57, a bore 58 and rails 59. The hook 57 extends from a front face of the switch 18. The bore 58 is made in a lower face of the switch 18. The rails 59 extend from two opposite sides of the switch 18. The switch 18 is located in the space 12, which is located above the platforms 42 and 43. Each of the rails 59 is movable in and along a corresponding one of the grooves 17 to render the switch 18 smoothly movable front and rear ends of the space 12. At the front end of the space 12, the hook 57 is engaged with the hook 55. The compression spring 56 allows the hook 55 to be pushed down by the hook 57 immediately before the hooks 55 and 57 are engaged with each other. The compression spring 56 lifts the hook 55 immediately after the hooks 55 and 57 are engaged with each other (FIG. 12).

Figure 7:
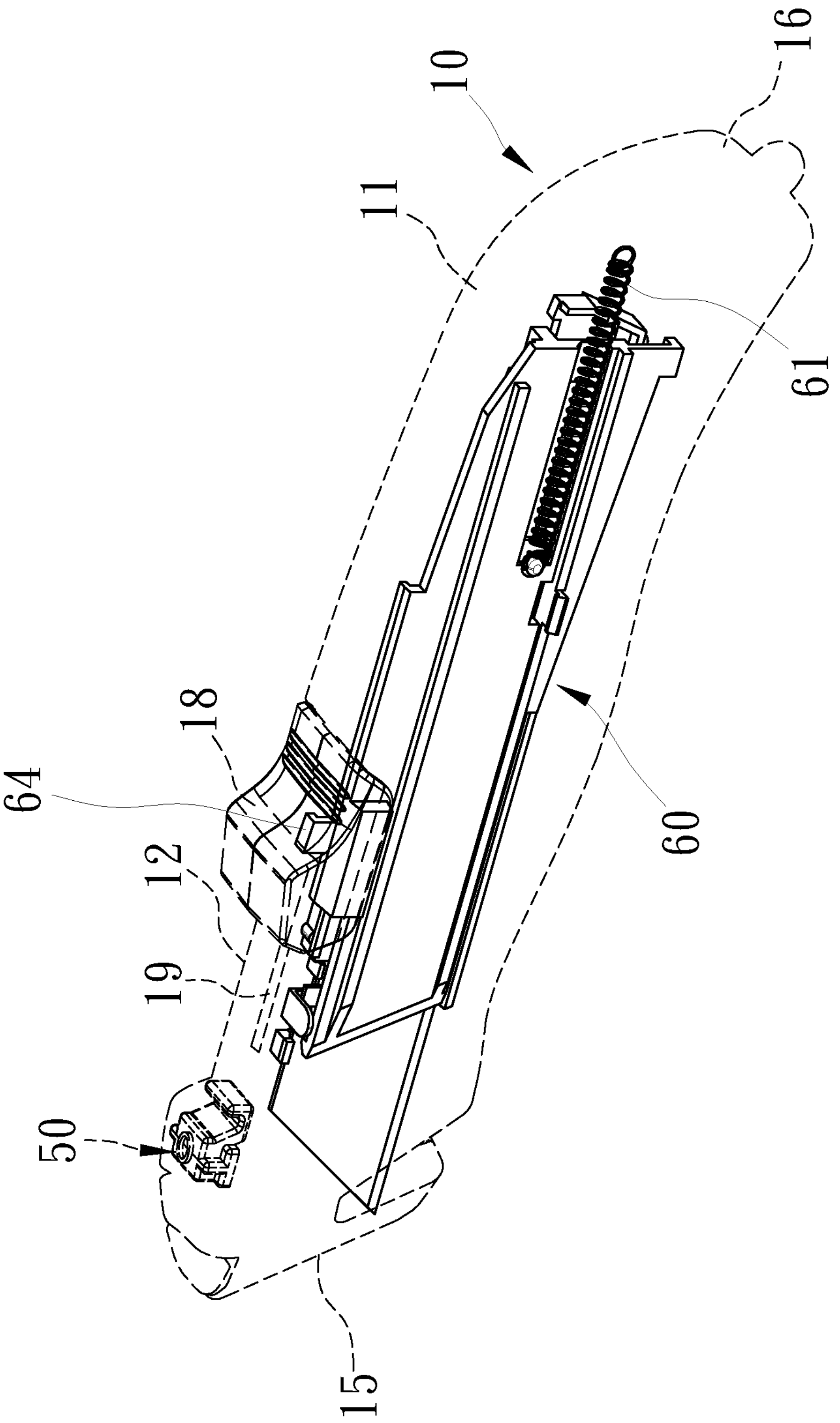
FIG. 7 is a perspective view of a blade and a holder of the boxcutter shown in FIG. 1.

The shell 13 includes a chamber 20. The shell 14 includes a chamber 30. The chambers 20 and 30 together become the space in the handle 11 to receive a holder 60 (FIG. 7). The shell 13 includes a mouth 28 in the front end. The shell 14 includes a mouth 38 in the front end. The mouths 28 and 38 become the open end 15 of the handle 11 (FIG. 1). The shell 13 includes a notch 29 in a lower portion. The shell 14 includes a notch 39 in a lower portion. The notches 29 and 39 become an orifice via which the space in the handle 11 is in communication with the exterior of the handle 11. A front end of the vertical facet 45 is in vicinity of the mouth 38.

Referring to FIGS. 7 through 12, the holder 60 includes a slat 62, a carrier 70 and an elastic leaf 80. The slat 62 includes a protuberance 63 extending from a side. A tensile spring 61 includes an end connected to the protuberance 63 and another end connected to a protuberance (not numbered) extending from the shell 14. Thus, the tensile spring 61 tends to move the slat 62 toward the closed end 16 of the handle 11 (FIG. 1). At an upper edge, the slat 62 includes a connector 64 inserted in the bore 58 through the slot 19. Thus, the switch 18 is operable to move the slat 62 between a front position and a rear position.

The connector 64 is in contact with a rear end of the slot 19 to keep the switch 18 at the rear end of the space 12 against the tensile spring 61. Now, the slat 62 is in the rear position to completely insert the blade 47 in the handle 11.

The switch 18 is operable to move the slat 62 to the front position. The slat 62 is retained in the front position as the hook 57 of the switch 18 is engaged with the hook 55 of the button 50. Thus, the slat 62 extends the front section of the blade 47 from the handle 11 through the open end 15.

The carrier 70 is formed with a flat space 71 in an internal side and a shallow space 75 in an external side. The carrier 70 is connected to the slat 62 via fitting, a rivet or a screw so that they are moveable together. A long rib 72 and a short rib 73 are in contact with the slat 62 so that the flat space 71 is covered by the slat 62. The flat space 71 receives the rear section of the blade 47, which is inserted in the handle 11 via the open end 15.

Figure 9:
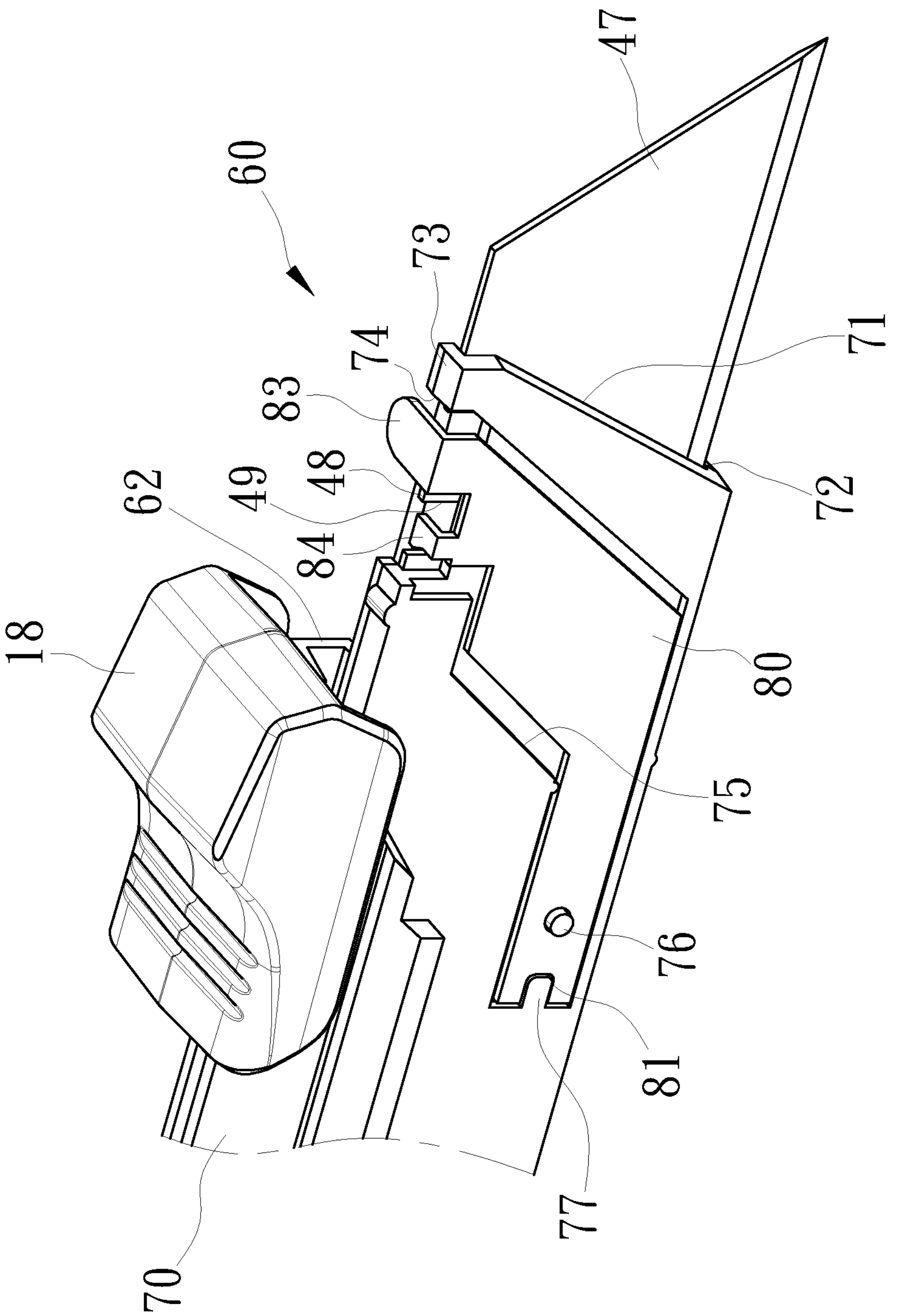
FIG. 9 is a partial view of the blade and holder shown in FIG. 8.

Preferably, the elastic leaf 80 is made of metal and shaped in compliance with the shallow space 75. The elastic leaf 80 is formed with a cutout 81 at a rear end and an orifice 82 in vicinity of the cutout 81. The cutout 81 receives a protrusive portion 77 formed on the carrier 70 and the orifice 82 receives a boss 76 formed on the carrier 70 to correctly locate the elastic leaf 80 in the shallow space 75 (FIG. 9). A free end of the boss 76 is enlarged to keep the elastic leaf 80 in the shallow space 75.

The elastic leaf 80 includes a lever 83 and a latch 84, both perpendicularly extending from an upper end. The lever 83 extends longer than the latch 84. The lever 83 is located higher than the latch 84 (FIG. 14), The lever 83 extends above a recessed section 74 of an upper edge of the carrier 70. The lever 83 shields a separating portion 48 formed between two cutouts 49 made in an upper edge of the blade 47. The lever 83 is operable to move the latch 84 into or from a selected one of the cutouts 49. A slant edge 85 of the latch 84 abuts against a front edge of the selected cutout 49 to bring the blade 47 into contact with the carrier 70 (FIG. 10) to render the blade 47 movable with the carrier 70.

The free end of the boss 76 is enlarged by heating and pressing or molding or any other proper means as long as the boss 76 becomes a rivet to keep the elastic leaf 80 in tight contact with the carrier 70. Alternatively, the boss 76 can receive a screw formed with an enlarged head larger than the orifice 82 in diameter.

Figure 10:
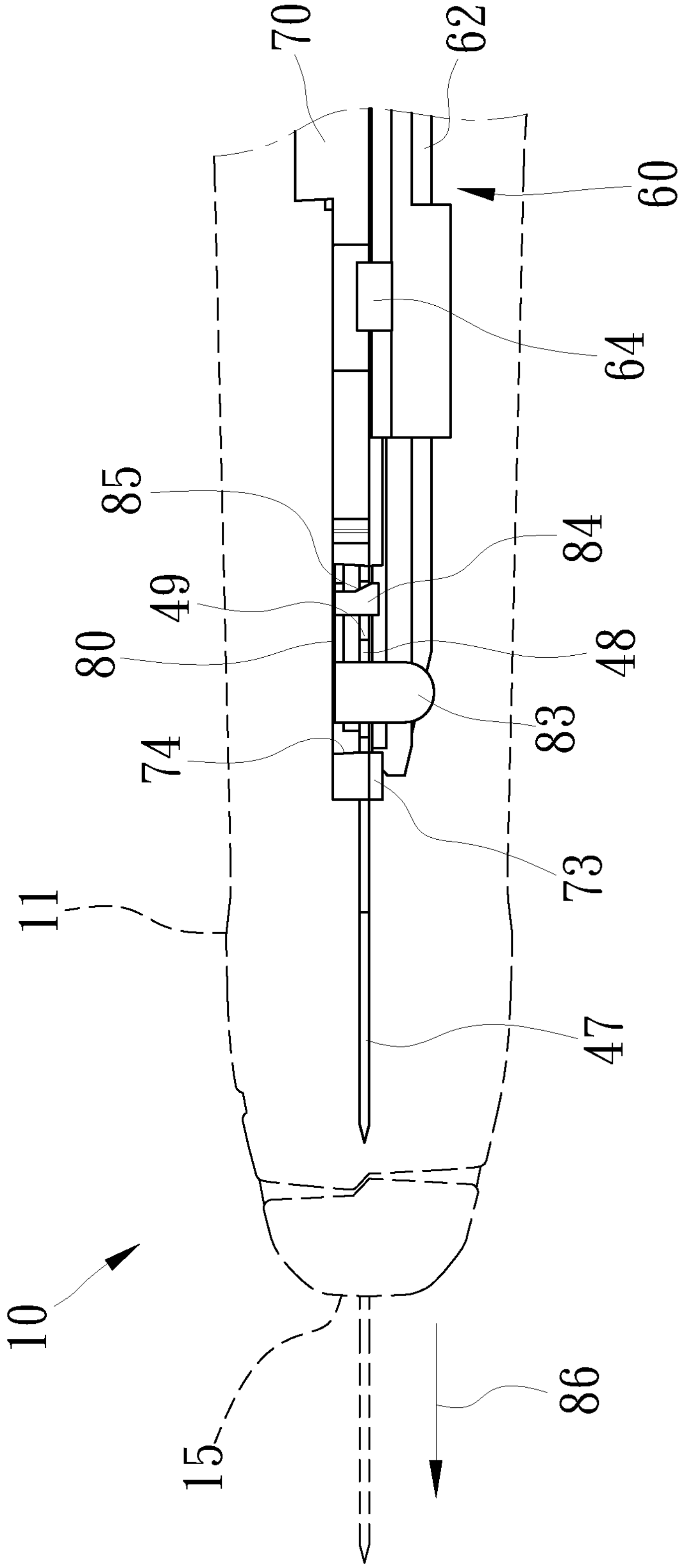
FIG. 10 is a top view of the blade and holder shown in FIG. 9.

Referring to FIG. 10, the holder 60, which includes the slat 62 and the carrier 70, is moved to the front position shown in phantom lines from the rear position shown in solid lines in a sense of direction indicated with an arrow head 86. The front section of the blade 47 is extended from the handle 11 via the open end 15.

Figure 11:
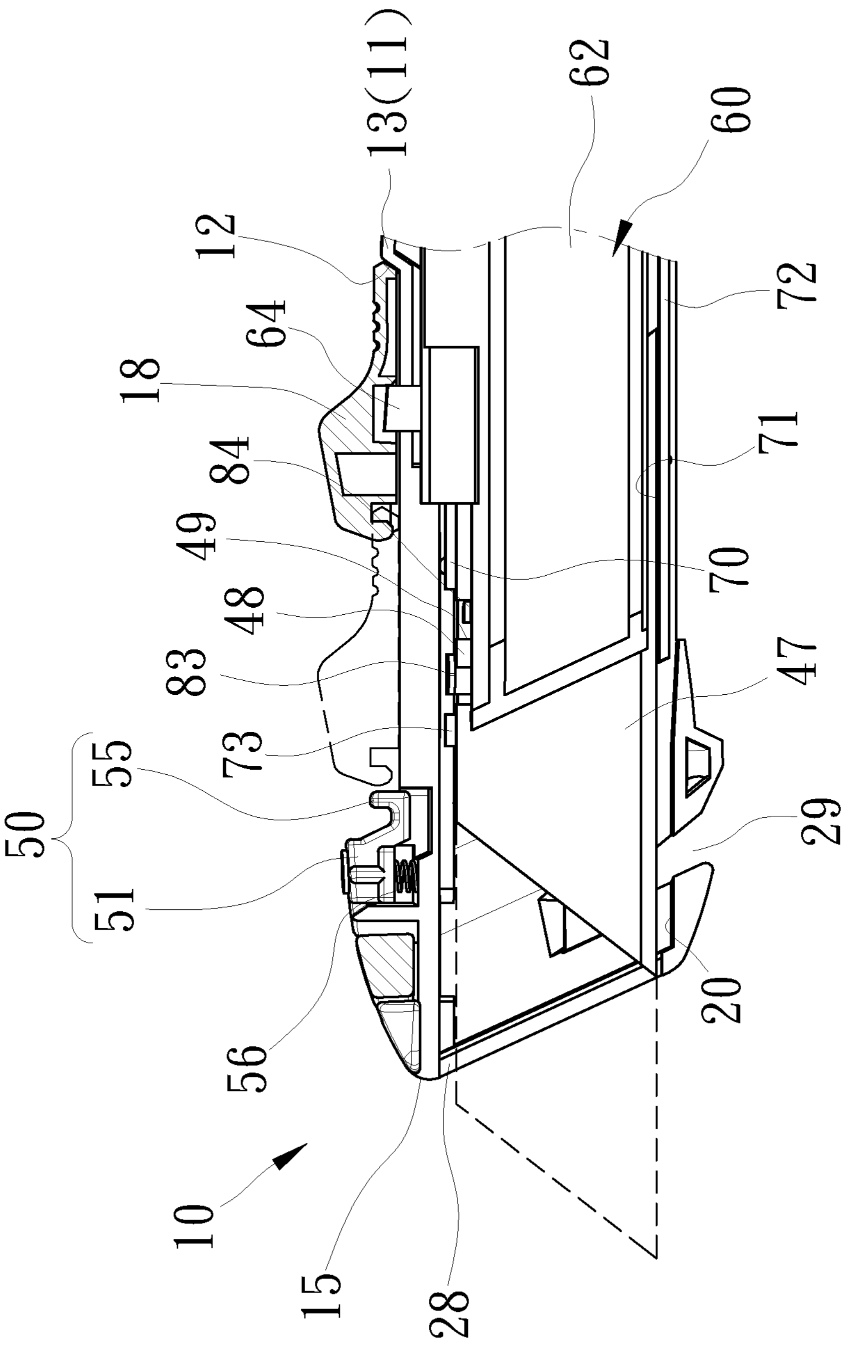
FIG. 11 is a side view of the blade and holder shown in FIG. 10.
Figure 13:
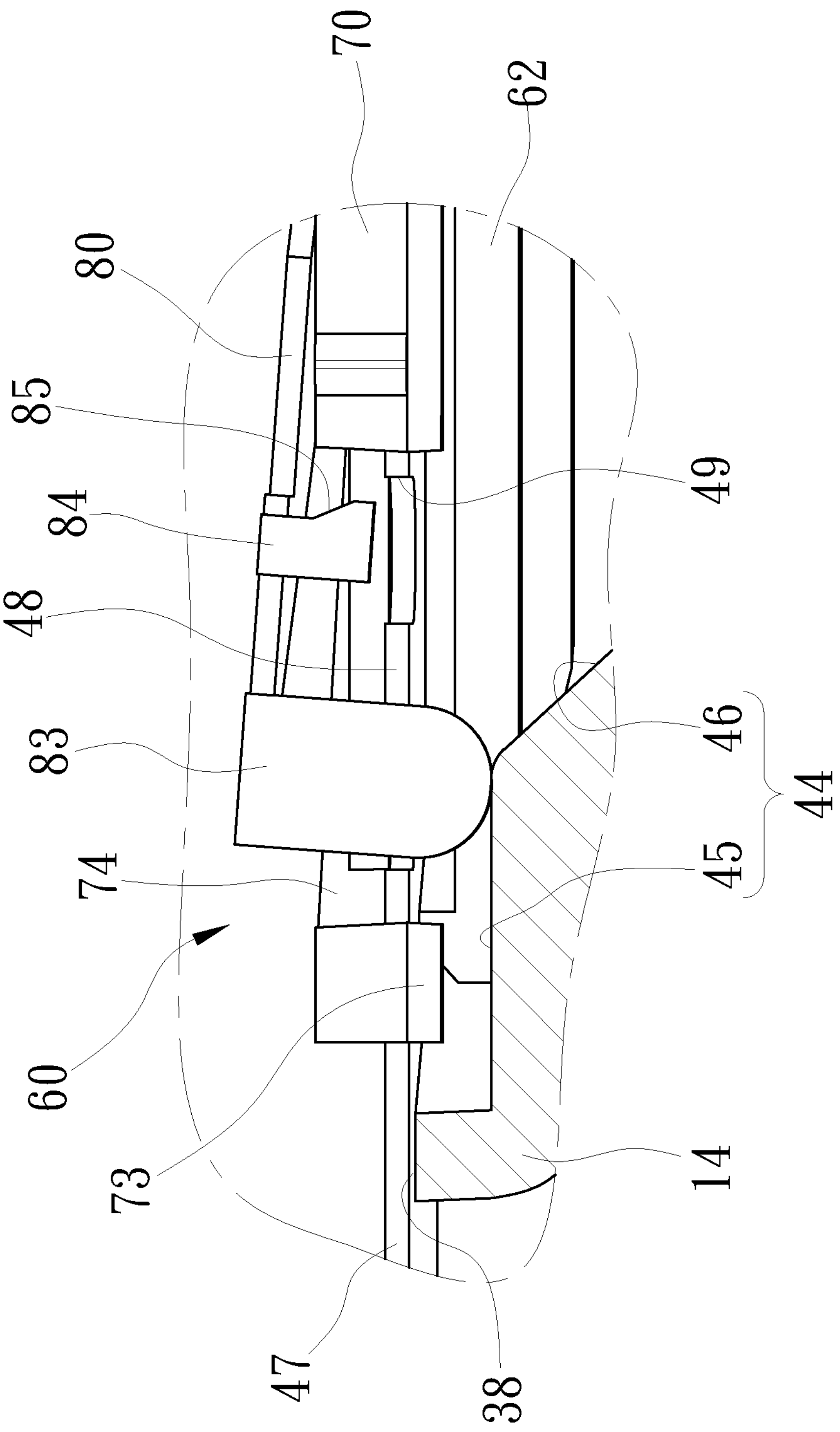
FIG. 13 is an enlarged partial view of the blade and holder shown in FIG. 10.
Figure 14:
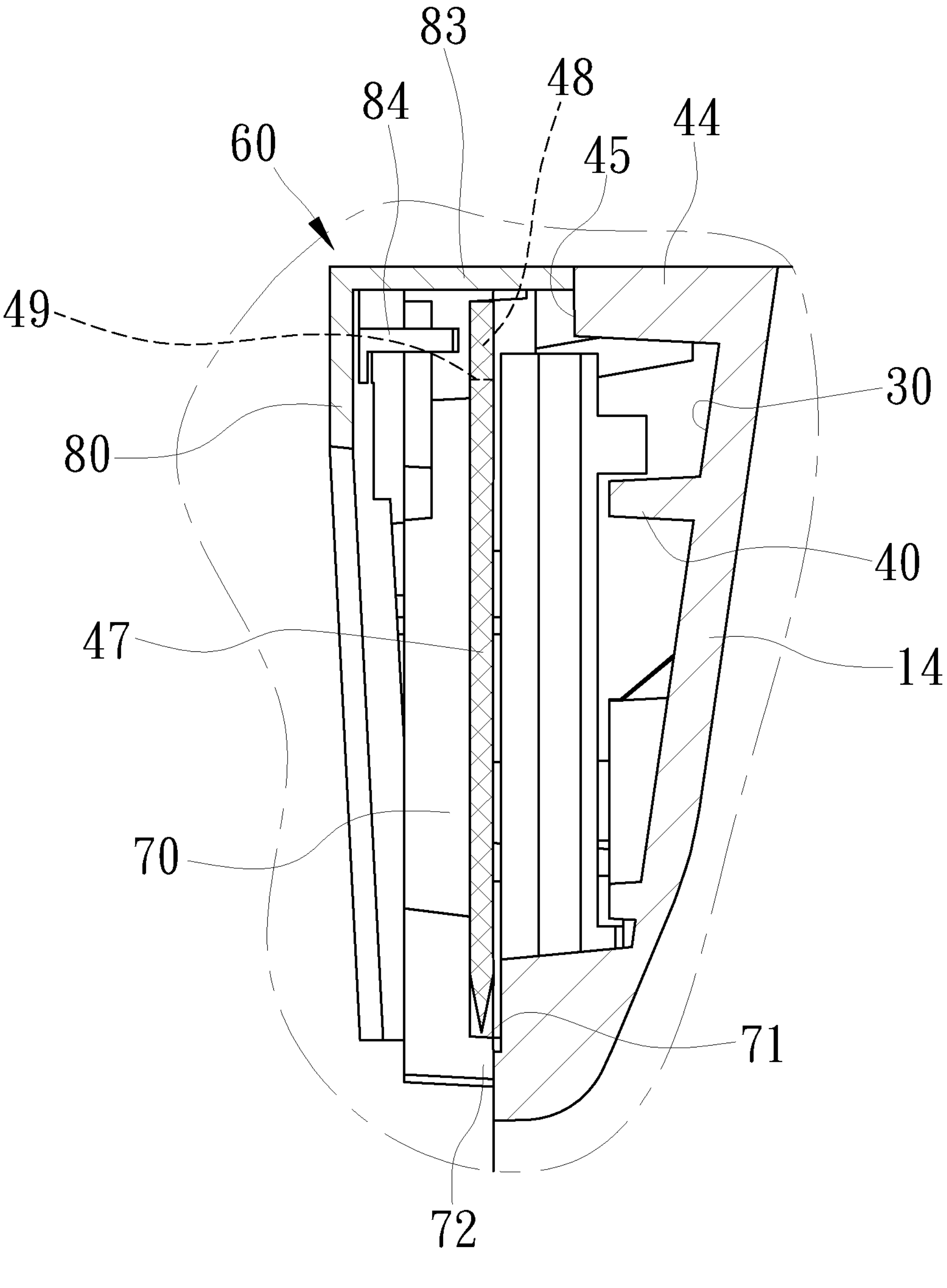
FIG. 14 is a cross-sectional view of the blade and holder depicted in FIG. 1.

Referring to FIGS. 13 and 14, during the movement of the holder 60 to the front position, the carrier 70 travels toward the open end 15 of the handle 11 (FIG. 11). The lever 83 slides on the slant facet 46 of the bump 44 of the shell 14 and finally reaches the vertical facet 45 of the bump 44 of the shell 14. Thus, the lever 83 bends the elastic leaf 80 to move the latch 84 from any of the cutouts 49 of the blade 47, which is partially inserted in the flat space 71. That is, the slant edge 85 no longer restrains any edge of any of the cutouts 49. This, the blade 47 is allowed to be moved from the handle 11 via the open end 15. A rear section of a new blade 47 can be inserted in the handle 11 via the open end 15.

Referring to FIGS. 7, 10, 11 and 13, the button 50 is pressed to disengage the hook 55 from the hook 57 of the switch 18 to allow the tensile spring 61 to move the holder 60 rearward. Thus, the lever 83 moves from the vertical facet 45 of the bump 44 to the slant facet 46 of the same, and then to the shell 14, thereby allowing the elastic leaf 80 to contact the carrier 70 and the latch 84 to extend into a selected one of the cutouts 49. Now, the substitution of the new blade 47 for the used blade 47 is completed. The tensile spring 61 keeps the holder 60 in the rear position where the new blade 47 is completely inserted in the handle 11.

Furthermore, even with the new blade 47 completely inserted in the handle 11, the boxcutter 10 can be used to cut a string or strap. To this end, a section of the string or strap is inserted in to the handle 11 via the orifice that consists of the notches 29 and 39.

The present invention has been described via the illustration of the preferred embodiment. Those skilled in the art can derive variations from the preferred embodiment without departing from the scope of the present invention. Therefore, the preferred embodiment shall not limit the scope of the present invention defined in the claims.

The invention claimed is:

1. A boxcutter comprising:

a handle comprising a bump on an internal face;

a blade insertable in the handle and comprising a front section, a rear section and a cutout; and a holder moveable in the handle between a front position to extend the front section of the blade from the handle and a rear position to insert the blade entirely in the handle and comprising:

a carrier formed with a flat space for receiving the rear section of the blade; and an elastic leaf comprising a rear section connected to the carrier and a front section formed with a lever and a latch, wherein the lever extends over the carrier and the latch extends in the cutout of the blade;

wherein when the holder is in the front position, the lever abuts against the bump of the handle to deform the elastic leaf to move the latch from the cutout of the blade.

2. The boxcutter according to claim 1, wherein the lever and the latch both transversely extend from a same side of the elastic leaf.

3. The boxcutter according to claim 2, wherein the lever extends further than the latch.

4. The boxcutter according to claim 2, wherein the lever is located higher than the latch.

5. The boxcutter according to claim 1, wherein the latch comprises a slant edge in contact with a portion of the blade to push the blade toward the he carrier.

6. The boxcutter according to claim 1, wherein the carrier comprises a boss, and the elastic leaf comprises an orifice for receiving the boss to keep the elastic leaf on the carrier.

7. The boxcutter according to claim 1, wherein the carrier comprises a shallow space for receiving the elastic leaf.

8. The boxcutter according to claim 1, wherein the holder further comprises:

a slat connected to the carrier; and a spring comprising an end connected to the slat and another end connected to the handle so that the spring tends to move the holder to the rear position.

9. The boxcutter according to claim 8, wherein the slat covers the rear section of the blade in the flat space of the carrier, and the lever and the latch both extend over the slat.

10. The boxcutter according to claim 8, further comprising a switch movable on the handle, wherein the handle comprises a slot, and the slat comprises a connector inserted in the switch via the slot.

11. The boxcutter according to claim 10, further comprising a button moveable on the handle between a locking position to keep the switch and a releasing position to allow the switch to move.

12. The boxcutter according to claim 11, wherein the switch comprises a hook, and the button comprises a hook for engagement with the hook of the switch when the button is in the locking position.

13. The boxcutter according to claim 11, further comprising a compression spring for biasing the button to the locking position.

14. The boxcutter according to claim 11, wherein the handle comprises a protrusion, a cavity made in the protrusion, and a bore in communication with the cavity, and the button is movable in the cavity while the hook of the button is inserted in the bore.

15. The boxcutter according to claim 14, wherein the button comprises two fins extending from two opposite sides, and the protrusion and an internal flange for abutment against the fins to keep the button on the handle.

16. The boxcutter according to claim 14, wherein the button comprises two opposite upright portions, and the handle comprises two cutouts for receiving the upright portions.

* * * * *